W. A. SMITH.
MECHANISM FOR AUTOMATICALLY LACING SHOE UPPERS.
APPLICATION FILED MAR. 17, 1904.

1,030,935.

Patented July 2, 1912.

WITNESSES.

INVENTOR.
Willard A. Smith

W. A. SMITH.
MECHANISM FOR AUTOMATICALLY LACING SHOE UPPERS.
APPLICATION FILED MAR. 17, 1904.

1,030,935.

Patented July 2, 1912.

WITNESSES.

INVENTOR.
Willard A. Smith

W. A. SMITH.
MECHANISM FOR AUTOMATICALLY LACING SHOE UPPERS.
APPLICATION FILED MAR. 17, 1904.

1,030,935.

Patented July 2, 1912.

WITNESSES.

INVENTOR.
Willard A. Smith

W. A. SMITH.
MECHANISM FOR AUTOMATICALLY LACING SHOE UPPERS.
APPLICATION FILED MAR. 17, 1904.

1,030,935.

Patented July 2, 1912.

WITNESSES.

INVENTOR.
Willard A. Smith

W. A. SMITH.
MECHANISM FOR AUTOMATICALLY LACING SHOE UPPERS.
APPLICATION FILED MAR. 17, 1904.

1,030,935.

Patented July 2, 1912.

UNITED STATES PATENT OFFICE.

WILLARD A. SMITH, OF PORTSMOUTH, NEW HAMPSHIRE, ASSIGNOR TO UNITED SHOE MACHINERY COMPANY, OF PATERSON, NEW JERSEY, A CORPORATION OF NEW JERSEY.

MECHANISM FOR AUTOMATICALLY LACING SHOE-UPPERS.

1,030,935.          Specification of Letters Patent.          Patented July 2, 1912.

Application filed March 17, 1904. Serial No. 198,576.

*To all whom it may concern:*

Be it known that I, WILLARD A. SMITH, a citizen of the United States of America, and a resident of Portsmouth, in the county of Rockingham and State of New Hampshire, have invented certain new and useful Improvements in Mechanism for Automatically Lacing Shoe-Uppers, of which the following is a specification.

My invention relates to improved means for mechanically and automatically tying together the two parts or quarters of shoe-uppers, preparatory to lasting and bottoming them.

In the machine forming the subject of my present invention I prefer to employ a number of individual lacing-cords, the same corresponding with the number of pairs of eyelets to be tied together. The machine is adapted to simultaneously insert the cords into a corresponding number of pairs of eyelets, as just stated, then to sever the cords, followed by simultaneously tying together the two ends of each piece of thus-severed cord, and then releasing the thus-laced and tied upper from the machine.

In carrying out my invention, or machine for automatically lacing and tying shoe-uppers, I employ a series of pairs of movable needles or hooks arranged in horizontal planes, each pair being adapted to hold the two ends of the corresponding lacing-cord; a series of pairs of movable loopers arranged in vertical planes in respect to said hooks, the lower portion of each pair of said loopers being constructed to support the cord while it is converted into loops; a series of vertically arranged movable fingers located between said looper members, the lower end of each finger coacting with the corresponding loopers and bottom hook in forming the loops, and a movable cutting member or knife adapted to simultaneously sever the several lacing-cords from the source of supply and prior to tying the ends together to form the respective knots. Thus it will be seen that the invention resides primarily in a machine adapted to simultaneously insert a series of needles or hooks into a series of pairs of eyelets mounted in a shoe-upper, the needles subsequently threading a corresponding number of individual lacing-cords through the series of eyelets, followed by simultaneously tying the two ends of each cord together, thereby mechanically securing together the two parts or quarters of a shoe-upper with a plurality of lacing-cords and having the ends of each cord tied or knotted together so as to hold the quarters of the upper in proper position or relation during the subsequent operations of lasting, bottoming, &c.

In the accompanying nine sheets of drawings, illustrating my improved machine for automatically lacing shoe-uppers, Fig. 20$^a$ shows the knot.

A more detailed description of my improved machine A for lacing and tying shoe-uppers is as follows: To a base $a$ is secured a pair of right and left parallel uprights or side frames $b$ provided with ways or front extensions $b^1$ $b^1$ in which are mounted the vertically slidable looper and finger carrier B and the cord and knife carrier C; the latter being located in front of the carrier B. A horizontal needle-guide or block D is interposed between and rigidly secured to the lower portion of said wings $b^1$, as clearly shown.

I may state here that the drawings represent the machine arranged to simultaneously introduce three lacing-cords into a corresponding series of pairs of eyelets mounted in the shoe-upper, the mechanism being further arranged to simultaneously and automatically tie the two ends of each individual cord together, followed by releasing the upper from the machine.

Figure 1:
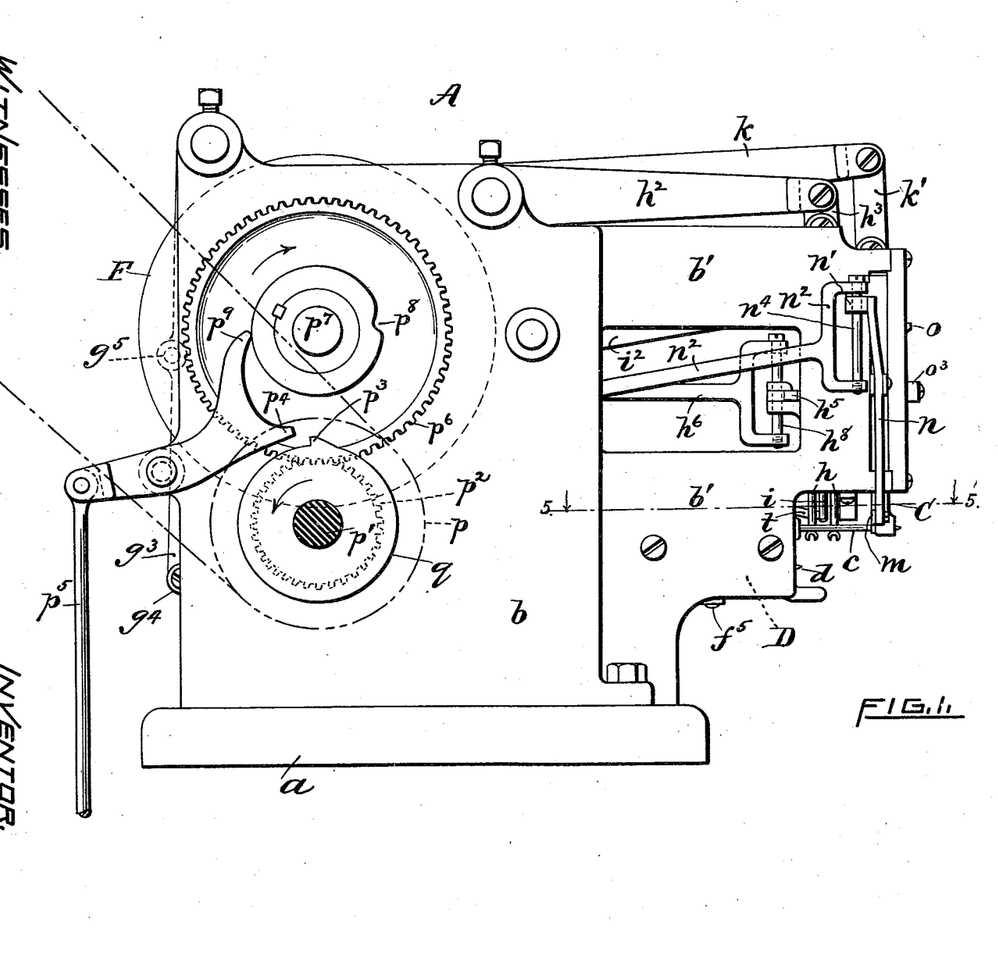
Figure 1 is a front, or left, end elevation, showing the parts in the normal working relation, the upper needles or hooks being advanced to engage the free ends of the corresponding lacing-cords.
Figure 2:
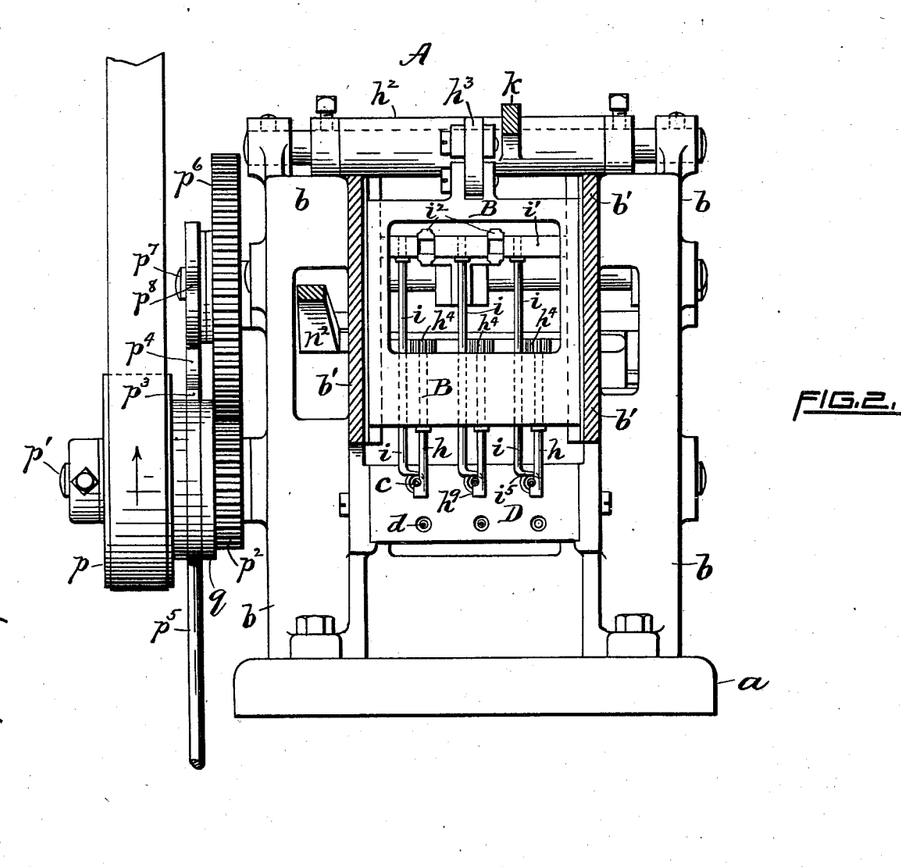
Fig. 2 is a corresponding front side elevation, in partial section.
Figure 3:
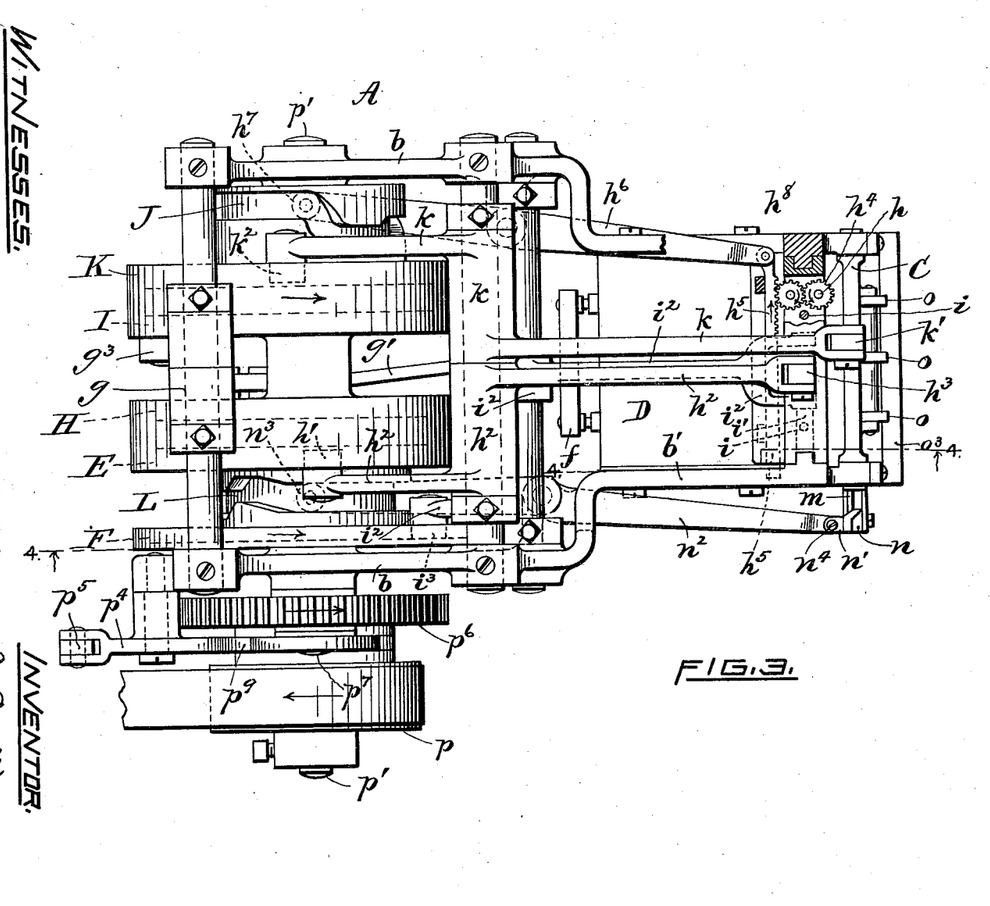
Fig. 3 is a plan view, corresponding with Fig. 1.

I prefer to provide the machine with any suitable or well-known driving and stop-motion device, whereby the machine stops automatically after making say one complete revolution. Driving mechanism of this character is represented in Figs. 1, 2 and 3, wherein $p$ indicates a continuously revolving belt-driven pulley loosely mounted on a short stud or shaft $p^1$. A friction-clutch, as $q$, is also loosely mounted on said stud, one portion being fast to a driving gear $p^2$, the other secured to said pulley. The clutch has a peripheral lug $p^3$ arranged to be engaged by a swinging dog or lever $p^4$, capable of being moved into and out of action mechanically or by a suitable manually controlled connection $p^5$, or both. Meshing with said gear $p^2$ is another gear $p^6$ (of suitable size) secured to the front end of the revoluble main shaft $p^7$ of the machine. A disk is fastened to said shaft provided with a cam-shaped notch $p^8$ adapted to receive a member $p^9$ of the said lever. Said member $p^9$ is located in the path of the revolving disk, and as drawn, is kept in continuous engagement with it by gravity. The parts are so positioned and timed that the dog enters the notch $p^8$, thereby depressing the member $p^4$ to be forcibly engaged by the lug $p^3$ of the clutch, the result being to arrest the clutch's forward movement and disconnect it from the pulley, thereby automatically stopping the machine after it has made one revolution.

The several instrumentalities or devices for effecting the various operations performed in inserting the lacing-cords through the eyelets of a shoe-upper and tying them are actuated by means of suitable cams secured to the revoluble main shaft $p^7$.

Figure 4:
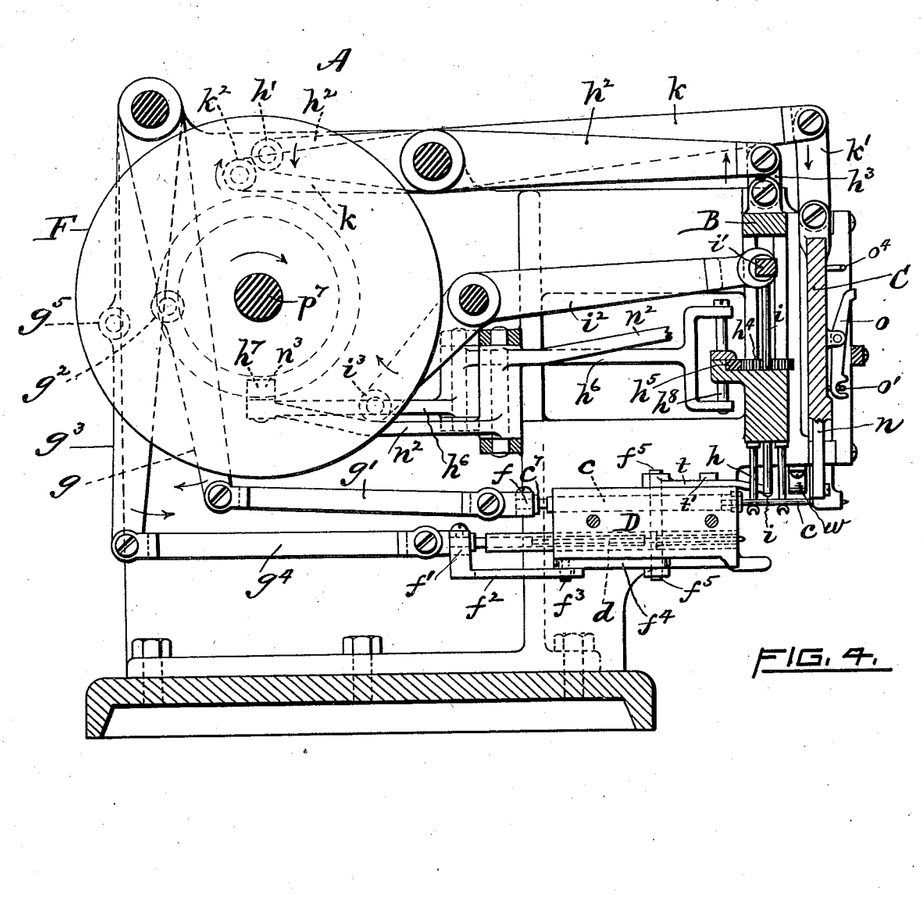
Fig. 4 is a transverse sectional view, taken on line 4 4 of Fig. 3.
Figure 24:
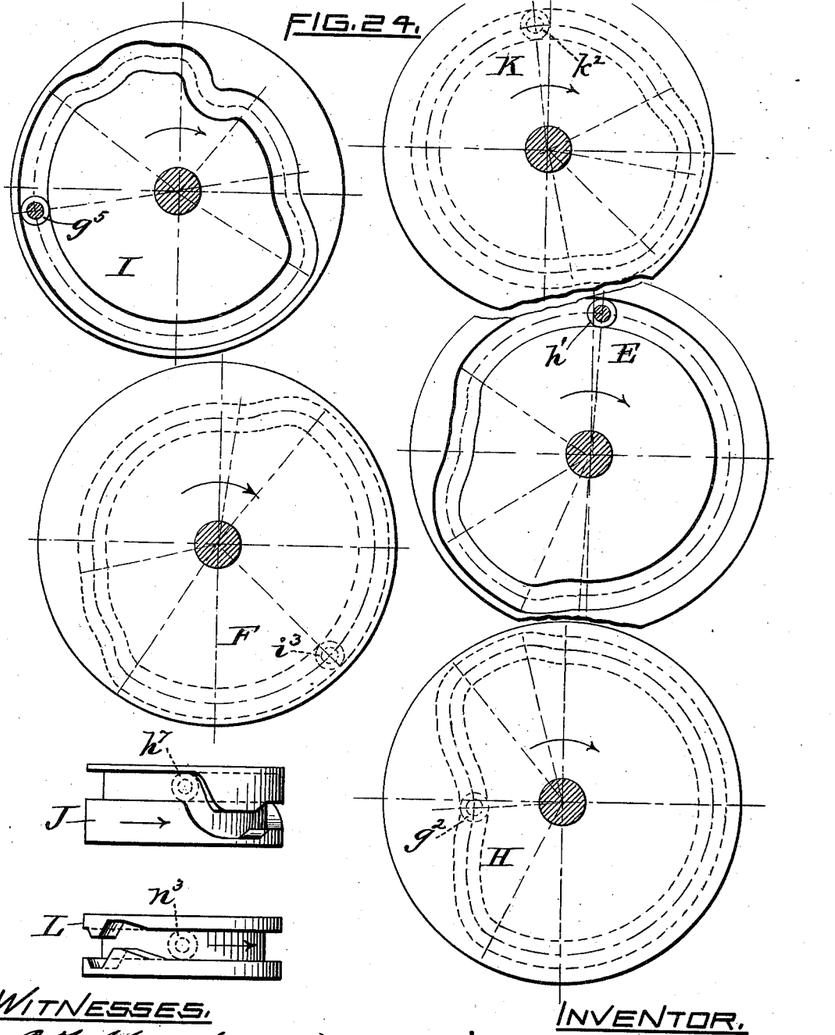
Fig. 24 is a diagrammatic representation of the cams employed for effecting the intermittent movements of the several devices.

In the present machine I employ a number (three) of upper horizontal needles or hooks $c$ and a corresponding number of similar needles $d$, the latter being located below and slightly to the right of the upper needles, see Fig. 2. All the needles are substantially alike and are arranged to move endwise in the stationary block or holder D. Each needle consists of a movable sleeve $c^1$ having its forward portion $c^2$ reduced in diameter, and the needle or hook member proper, $c^3$, capable of independent movement extending longitudinally through said sleeve. The rear portion, $c^4$, of the needle is cylindrical and enlarged and is slidably mounted in the sleeve member. The latter is capable of a short independent endwise movement by means of a transverse pin, $c^5$, secured to the needle-shank $c^4$ and extending into a longitudinally slotted opening $c^6$ formed in the sleeve, as clearly shown in Fig. 7. The rear end of each member $c^3$ has a collar or shoulder, $c^7$, adapted to abut the corresponding end of its sleeve. The upper set of needles are secured to a horizontal cross-bar $f$, the lower ones being secured to a similar bar $f^1$. See Fig. 4. The upper needles are actuated by a swinging depending lever, $g$, jointed at its lower end to a link $g^1$, also jointed to the cross-bar $f$. A truck-roll $g^2$ is carried by said lever, the same working in a cam-groove H formed in the face of the cam-disk. See Fig. 24. A similar device is employed for operating the lower needles. That is to say, a swinging lever, $g^3$, is jointed to a link $g^4$, the latter also jointed to the cross-bar $f^1$. Said lever carries a truck-roll $g^5$ working in a cam-groove I, formed in the face of the corresponding cam-disk, Fig. 24. Thus it will be seen that the movements of each set of needles are controlled by the said cams H and I, and intermediate mechanisms. The said carrier or slide B, which carries the loopers $h$ and the intermittently movable fingers $i$, is actuated by a cam E, secured to shaft $p^7$, through the medium of a truck-roll $h^1$ working in the cam, Fig. 24, a horizontal two-arm pivoted lever $h^2$ having one arm carrying said roll, the other being jointed to a short vertical link $h^3$, in turn jointed to the upper end of the slide or cross-head B. See also Fig. 4.

The fingers $i$, three in number, extend upwardly through the lower portion of member B and are secured to a cross-head $i^1$ (Figs. 2 and 4) movably mounted therein. Motion is imparted to the fingers by means of a two-arm swinging bent lever $i^2$ jointed to the cross-head, the opposite end of the lever carrying a truck-roll $i^3$ working in a suitable cam-groove F; (Fig. 24) the rotation of the latter giving an irregular intermittent reciprocating movement to the fingers. The loopers $h$ are revoluble in said slide B and consist of three pairs, the axes of each pair being practically in alinement with the corresponding lower needle. The upper end of each looper has a small spur gear $h^4$ secured thereto; each pair of loopers intergearing, as clearly shown. See also Fig. 3. The gears of the rear row of loopers mesh into a suitably guided horizontal endwise movable rack member $h^5$. The right or rear end of the rack being jointed to a swinging two-arm lever $h^6$, the opposite end of the latter having a truck-roll $h^7$ working in a cylinder or barrel-cam J (Fig. 24) secured to the main shaft. In order to provide for the vertical movement of the cross-head B and at the same time permit the horizontally movable rack to perform its function the latter has a vertically slidable pin $h^8$ passing therethrough and secured to the yoke-shaped end of said lever $h^6$. See Fig. 4. The lower end of each looper $h$ is cylindrical, the axis of the latter being at right angles to that of the shank. The said cylindrical portion is extended laterally on one side to form a shoulder or loop-holder $h^9$ and is cut away on its under side to freely receive the reduced part $c^2$ of the lower needle sleeve. The loopers of each pair are adapted to revolve simultaneously in opposite directions, the maximum angular movement being, as drawn, about 270°. The said cord and knife carrier or plate C is mounted in front of the looper-carrier. It is vertically movable in the ways or extensions $b^1$ of the two side frames. This carrier is intermittingly reciprocated by means of a swinging two-arm lever $k$, jointed to a link $k^1$ in turn jointed to the carrier. The opposite arm of the lever has a truck-roll $k^2$ working in a suitable cam K, Fig. 24. The construction and arrangement being substantially the same as that employed for actuating the looper-plate or cross-head B. The lower portion of plate C has three transverse holes $k^3$ extending therethrough in alinement and registering with the upper needles $c$. Each of said holes has an upper eye or cord passage $k^4$ communicating therewith through which the free end of the lacing-cord is threaded or guided. Just above the said needle-holes $k^3$ the plate is pierced with another series of holes, $k^5$, these latter register with the lower needles $d$ when the plate is in its lowest position. See Figs 5, 5½ and 6.

An endwise movable thin cord-severing knife $m$ is suitably mounted at the rear of plate C. The blade of said member $m$ is notched and sharpened contiguous to the lower holes $k^3$, thereby forming three cutting or shearing edges $m^1$, Fig. 6. As thus arranged the three cords are severed simultaneously upon moving the knife toward the left or front end of the machine. This movement is effected by a vertically arranged swinging lever $n$ pivoted to and moving with the plate C, its upper arm having an eye or guide $n^1$ capable of turning slightly therein. A swinging two-arm lever $n^2$ carries a truck-roll $n^3$ at one end thereof working in a suitable barrel-cam L, Fig. 24, the other arm being yoke-shaped and having a vertical pin $n^4$ therein passing through said guide $n^1$. Thus it will appear that the knife is capable of movement independently of that of the plate. See Fig. 1.

Figure 11:
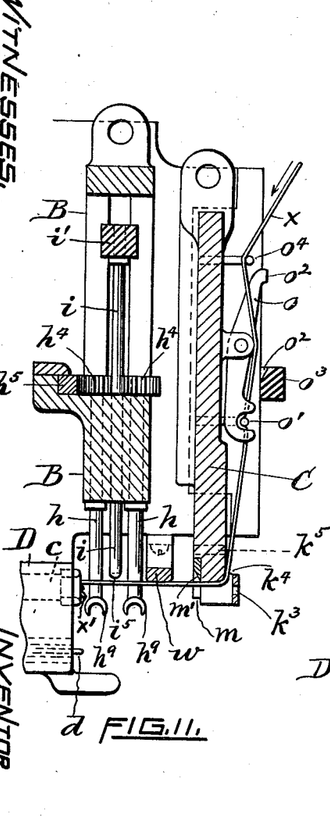
Figs. 11 to 22, inclusive, are side views, in partial section, showing steps in the formation of the loops and knots and the corresponding positions of the needles, loopers, &c.
Figures 19, 20, 22, 23:
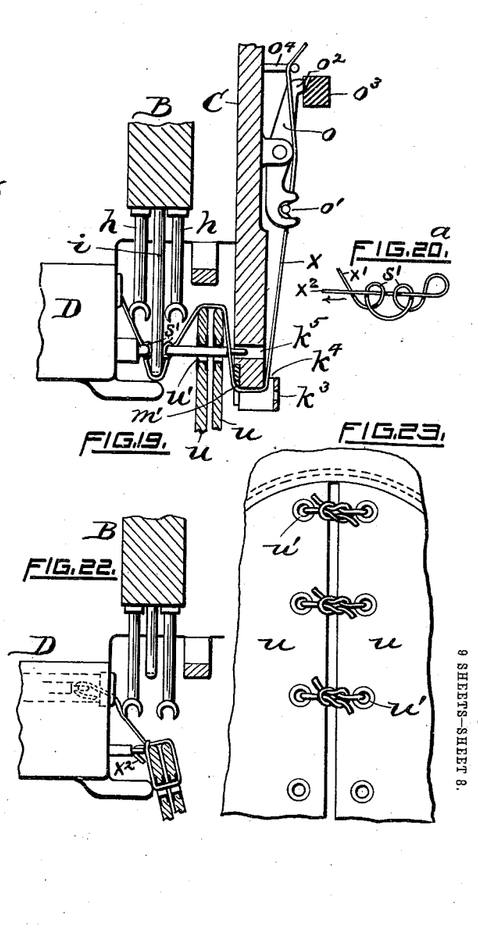
Fig. 23 is a plan view, showing a portion of the thus laced and tied shoe-upper.
Figure 20:
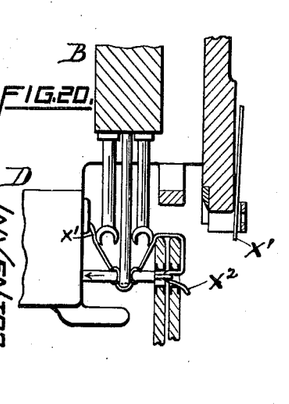

To the front of the vertically movable plate member C are pivoted three tension or cord-controlling levers $o$, one for each cord $x$ used. The lower end of each tension-lever is recessed or adapted to receive the cord. A bent wire or finger $o^1$, secured to the plate (Fig. 11, &c.,) extends in front across said recessed portion of the lever and forms a brake or tension upon the cord whenever the latter is to be severed. The upper end $o^2$ of lever $o$ is arranged to engage the front stationary bar $o^3$ just prior to the termination of the plate's downward movement thereby swinging the lever ahead a short distance and pinching the cord between it and the corresponding finger $o^1$. This arrangement serves to temporarily hold the cord taut and prevent it from rendering until the member C again moves upwardly. Fig. 19 shows the device in action. Each cord is fed from any suitable source of supply and may be threaded through an eye or guide $o^4$ before passing to the tension device.

I prefer to provide each pair of loopers with means for automatically detaching or transferring at the proper time the loops formed on the shoulders $h^9$ onto the corresponding lower needle $d$. For this purpose I employ what may be termed a stripping device; this latter, is, for the sake of clearness, omitted from several figures of the drawings, but is shown in enlarged scale in Figs. 8, 9 and 10; the operating mechanism therefor being represented, in reduced scale, in Figs. 4 and 5. To the lower portion of each looper $h$ is pivoted a vertical spring-pressed lever $r$. These are arranged right and left with respect to each pair of loopers, see Fig. 8. The lower end $r^1$ of each lever $r$ is slidably fitted to the curvature of the shoulder $h^9$, the upper end of the stripping-lever being bent inwardly and provided with a lateral extension $r^2$, the two latter forming a V-shaped or flaring mouth $r^3$ adapted when properly positioned to receive the correspondingly shaped end $r^4$ of a swinging horizontal lever $t$, see Fig. 10.

To the underside of the lower needle-operating cross-bar $f^1$ is secured a horizontal cam-plate or member $f^2$, the same extends toward the front and has a pin or roll $f^3$ slidably movable therein, said roll being mounted on the rear end of a lever $f^4$ secured to an oscillating shaft $f^5$ extending vertically through the center portion of the needle-block D. Said shaft in turn having the lever $t$ secured to its upper end, see Figs. 4 and 5.

In order to insure a simultaneous action of the three strippers the other two swinging levers $t$ are jointed to the center one by a horizontal tie or link $t^1$. Thus it will be seen that when the cam proper of the advancing member $f^2$ engages the roll $f^3$ the latter, by means of the several levers, &c., causes the ends $r^4$ of the arms $t$ to quickly advance into the openings $r^3$ and force the members $r$ apart, thereby sliding the strippers proper, $r^1$, of each pair of loopers, toward each other or inwardly, it being of course understood that the movements of the cam are so timed that the levers $t$ are actuated only when the strippers are in the position represented in Figs. 8 and 10.

Figures 5, 6, 7, 8, 9, 10:
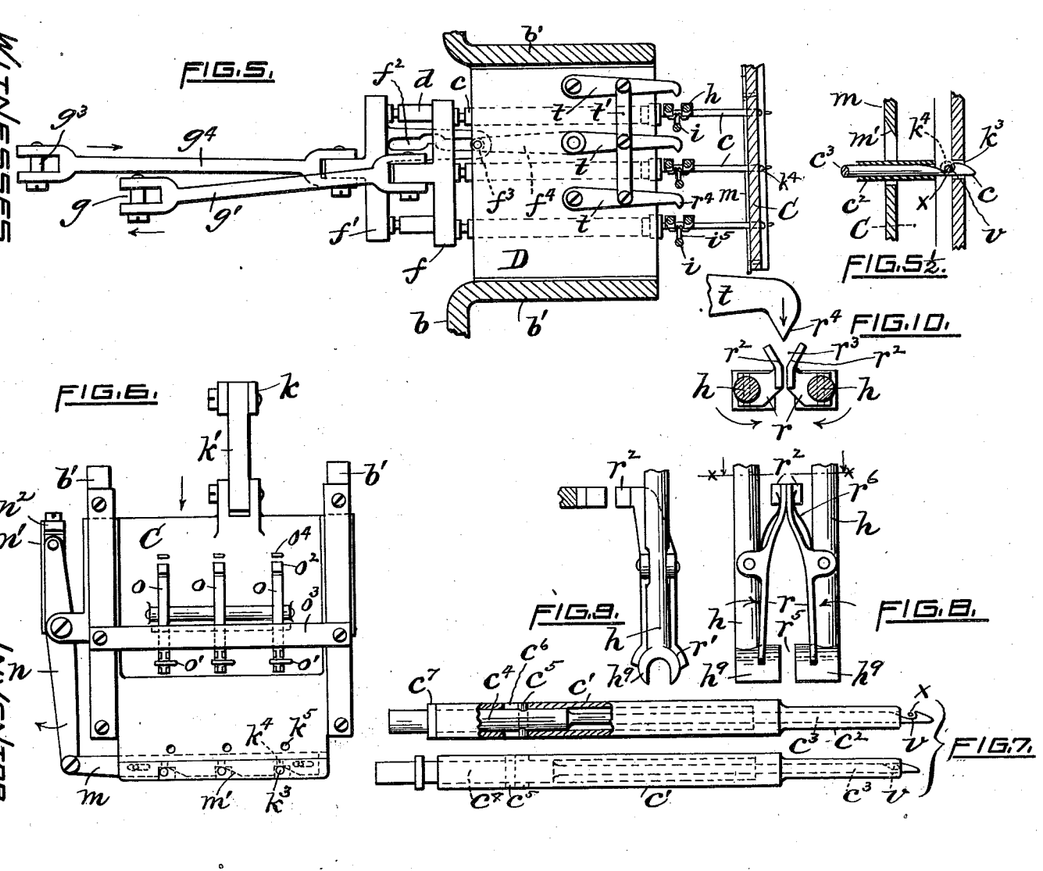
Fig. 5 is a horizontal section, taken on line 5 5 of Fig. 1. Fig. $5\frac{1}{2}$ is a detail view of devices to be described.
Fig. 6 is a front view of the cord-carrier, &c., detached from the machine; its relation thereto corresponding with the position shown in Fig. 1.
Fig. 7 is a side elevation (in partial section), in enlarged scale, showing one of the needles in the open and closed positions.
Fig. 8 is a side view, in enlarged scale, showing the lower portion of a pair of the loopers provided with a stripping device, preparatory to having the looped cord stripped therefrom.
Fig. 9 is a corresponding side elevation.
Fig. 10 is a horizontal section, taken on line $x$ $x$ of Fig. 8.
Figure 12:
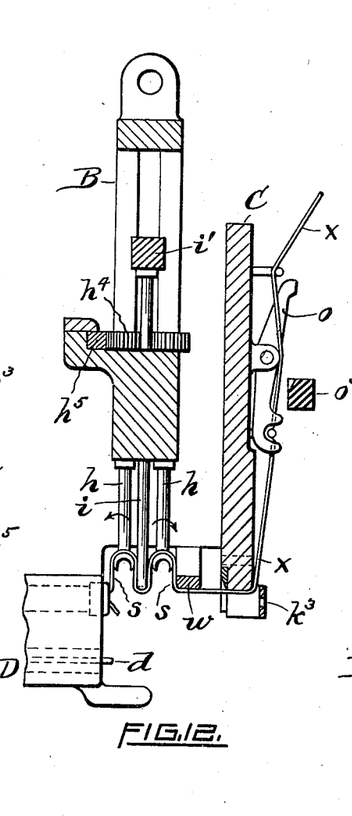
Figure 13:
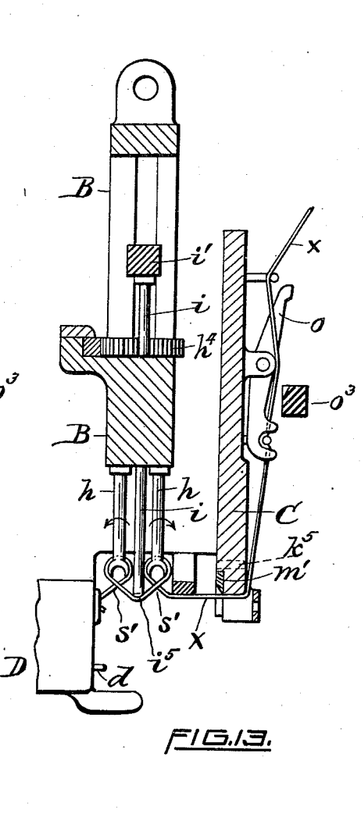
Figure 14:
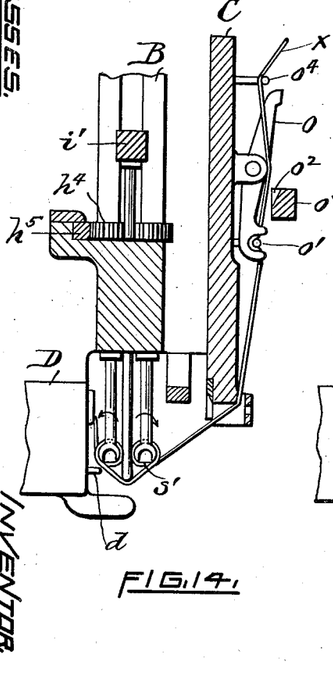
Figure 15:
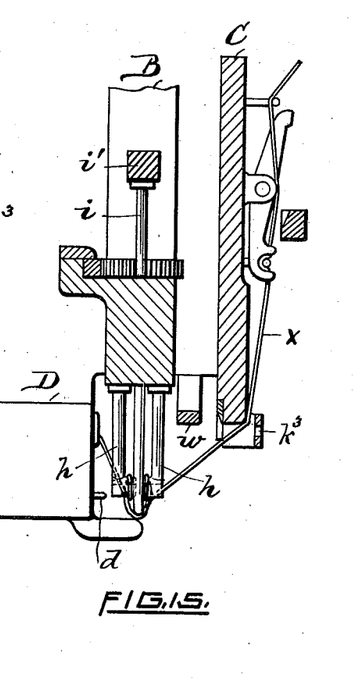
Figure 16:
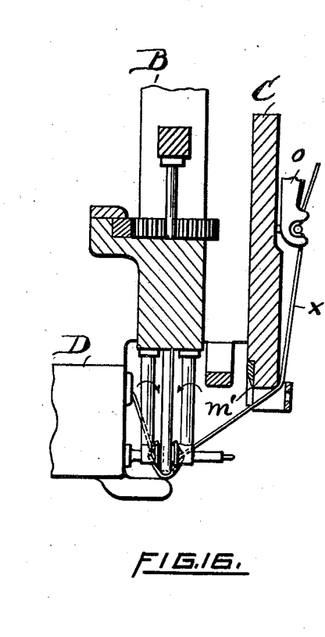
Figure 17:
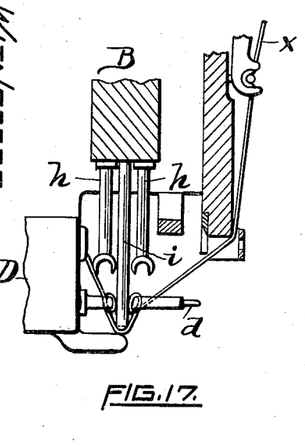

The manner of operation of my improved shoe-lacing machine A is as follows: Assuming first, however, that the several devices or instrumentalities thereof have been constructed, positioned and timed substantially as represented in Figs. 1 to 6, inclusive, and that the free ends of the three independent lacing-cords $x$ have been properly threaded through the respective eyes $o^4$, the tension devices and the bottom eyes $k^4$, the latter communicating with or located immediately to the rear of the lower needle-holes $k^3$ of the front cross-head or plate C. Now the machine being in action and the upper set of needles $c$ advanced to their limit, substantially as indicated in Figs. 1 and 5, the needles at the same time being above the loop-holders $h^9$ but below the fingers $i$, and also extending through the lower holes $k^3$ of the then elevated plate C, the continued rotation of the main shaft causes the cam H to quickly retract the needles, the outer end of each having a hook or notch $v$ therein (see Fig. $5\frac{1}{2}$), thereby simultaneously engaging the free ends of the corresponding cords and drawing them into the reduced portions, $c^2$, of the sleeves $c^1$, or until the pins $c^5$ of the needles are arrested in the rear end of the slotted openings $c^6$, the continued rearward movement of the needles drawing the cords through the eyes $k^4$, past the loopers $h$, and finally into the mouth of the respective needle-guides, where they are held fast. See corresponding position, Fig. 11. This is followed by the action of cam E, lever $h^2$, &c., to elevate the cross-head B, thereby simultaneously carrying the loopers upwardly to their limit, the loop holders at the same time engaging and carrying the then lightly tensioned cords with them. Each set of loopers thus forms a pair of open or semi-loops $s$ in its cord. The respective fingers $i$ meanwhile remain stationary in the extreme upward position, but below the loop-holders. See Fig. 12. It will be seen (Fig. 2) that the lower end $i^5$ of each member $i$ is bent at substantially right angles and extends horizontally past the center line of the respective needle and forms the finger or guard proper. The cords bear against the under side of the fingers and also against the lower side of a stationary cord-guide $w$ located in front of the forward loop-holders. It is to be understood that the several cords render freely or under light tension while they are being thus converted into loops and before being severed from the source of supply. At about this part of the operation the action of cam J, lever $h^6$, rack $h^5$ and the several pairs of looper-gears $h^4$ will simultaneously revolve each pair of loopers 180°, thereby transforming the open loops $s$ into closed loops $s^1$, see Fig. 13. The loopers and fingers are, by means of cams E and F and their connections, next forced downwardly in unison, thereby further closing or contracting the loops $s^1$. See Fig. 14. The cam J, &c., next further revolve the loopers 90° in the same direction as before, see arrows, the other mechanism at the same time forcing them, together with the fingers, to the lowest position. See Fig. 15. In this position it will appear that the loop-holders face each other, the axes of each pair being practically in alinement with the corresponding lower needle $d$. While the parts are in this position the needles $d$ are simultaneously advanced through the open loop-holders by means of the cam I, &c. See Fig. 16. It is just prior to or at substantially this instant that the stripping device is brought into action, the corresponding position of the same being shown in enlarged scale in Figs. 8, 9 and 10; the looped cord, however, being omitted. This is effected by the engagement of the advancing cam $f^2$ (Fig. 5) with the lever $f^4$, thereby quickly vibrating the latter and causing the free ends $r^4$ of the several arms $t$ to simultaneously engage and actuate the spring-pressed members $r$, thus moving them inwardly and stripping or clearing the cord-loops $s^1$ from the holders $h^9$; the loops then passing into the open space $r^5$, formed between the adjacent faces of the holders, and around the forward part $c^2$ of the needle-sleeve extending through the pair of holders. At this instant the cam proper of the advancing member $f^2$ has completed its work, thereby returning the arms $t$ to the normal stationary position, the springs $r_6$ at the same time automatically swing the strippers to their normal position, shown in Fig. 9. While this is taking place the action of cams J and E quickly rotate the holders backwardly and lifts them to the original position, shown in Fig. 11, the finger $i$ meanwhile remaining depressed and holding the bight of the cords thereunder below the lower needles, as shown in Fig. 17. At this part of the operation the end $p^9$ of the shipper or clutch lever will swing into the cam notch $p^8$, thereby placing the lever in position to be instantly engaged by the lug $p^3$ of the revolving clutch, the result being to automatically release the clutch from the continuously traveling pulley and stop the machine.

Figure 18:
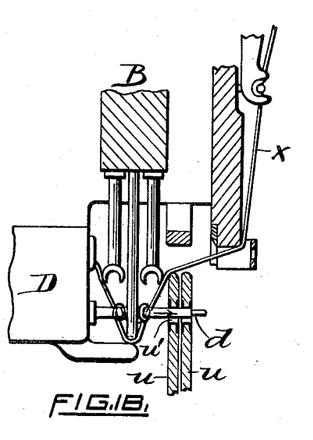
Figure 21:
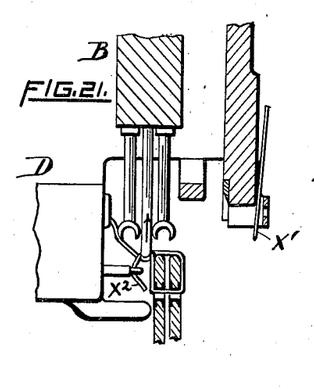

The operator or attendant next folds the two quarters or flaps $u$ $u$ of the shoe-upper together flatwise, so that the eyeleted holes of the two parts register with each other, and places the same vertically onto the lower needles $d$, the latter obviously having been arranged or spaced to register with a corresponding number of pairs of the holes $u^1$, substantially as represented in Fig. 18. The machine is now restarted, the result being to immediately depress the cord and knife carrier C to its limit, thereby, at the same time, forcing the levers $o$ into engagement with the pins $o^1$ to hold the cords in check under considerable tension. At the same time too the action of cam I, &c., forces the previously open lower needles ahead into the then registering upper series of holes $k^5$ of said carrier C, as indicated in Fig. 19. While in this position the lower needles are retracted a short distance, thereby securing the cords therein, followed by the action of cam L, &c., which forces the guided knife $m$ endwise (or toward the left, shown in Fig. 6) and simultaneously severs the cords from the sources of supply. The carrier is next elevated to its normal position and the knife returned to its former open position, the depending free ends, $x^1$, of the cords then adapted to be picked up by the upper series of needles at the proper time. Fig. 20 shows the corresponding relation of the parts, and also represents the retreating lower needles in the act of drawing the severed part $x^2$ of the cord rearwardly through the eyeleted holes of the upper, the fingers $i$ moving upwardly at the same time. The continued movement of said needles in the same direction draws the ends $x^2$ of the cords completely through the holes and the double loops $s^1$, the latter thereby at the same time being shed from the needles. (Fig. 20$^a$ shows the thus-looped cord). While this is being effected the upwardly moving fingers and the weight of the needle-freed upper, see Fig. 21, operates to automatically slide the loops from the bent toe or guard $i^5$ (Fig. 2) of the several fingers, thereby drawing the loops into closer knots, the upper then being held only by the two ends of the pieces of cord retained in the respective needles. See Fig. 22. The final movement rearwardly of the lower needles releases the ends of the corresponding cords, while at the same time the upper needles are advanced to the first or original position, shown in Fig. 1, thereby releasing the other ends of the cords and completing the cycle of steps or operations.

Fig. 23 is a top view representing a portion of the thus mechanically laced and tied shoe-upper, the quarters being spread apart or flattened. It will be seen that each of the three pairs of holes is secured together by a separate cord or lacing.

I may state that when the lacing and tying operations are performed by hand it is almost impossible to tie the cords at the proper point or length, with respect to the eyelets, so that when the upper is opened or flattened out they (the cords) will draw evenly, or substantially as represented in Fig. 23. Any unevenness in the tying is objectionable because the upper cannot, in such case, be properly fitted over the last in the bottoming operation. By means of my present invention the objection just referred to is overcome, in that the several lacings will be of the exact length, the knots being uniformly located and tied, thus insuring that the upper will draw over the last properly.

While it has been deemed necessary to describe the several devices or sub-operations in a relative order or sequence it is to be understood that at certain times two or more of them may be working concurrently or substantially in unison. I may further state that the construction, arrangement and positioning of the parts as well as the timing of them with respect to one another are such that the work is accomplished with great facility and efficiency, the time consumed during each lacing operation being only a few seconds.

I am aware that machines have been devised in which the shoe-upper or work is held in position while it is being pierced with the cord-carrying needle, or needles, the work being advanced mechanically step by step after the formation of each loop. In such former methods great care must be exercised in placing the eyelets in alinement with the needle, as otherwise the latter is liable to pierce the leather, thus making poor or unsalable work. Sometimes the needle will pass through the eyelet of one quarter of the shoe-upper and through the leather of the other quarter; in this case also imperfect work is produced.

In my improved machine for lacing shoe-uppers the operator places the work on a series of normally stationary needles, the latter by this method simultaneously entering a corresponding series of pairs of eyeleted holes formed in the folded upper. By means of my improvement it becomes practically impossible for the attendant to accidentally misplace the upper on the needles, therefore the work is performed in a more perfect and expeditious manner, because the several lacing-cords introduced into the corresponding pairs of eyeleted holes are converted into loops simultaneously, and not successively as in prior machines of this class.

I do not desire to limit my invention to the exact construction of the instrumentalities or devices as illustrated in the drawings, as other or analogous means may be employed without departing from the spirit of the invention.

Having thus described my invention what

I claim as new and desire to secure by United States Letters Patent, is—

1. In a machine for lacing and tying together the eyeleted parts or quarters of shoe-uppers preparatory to lasting and bottoming them, the combination of a plurality of mechanically operative upper needles for seizing and holding the free ends of a corresponding number of individual lacing-cords, means for producing a pair of loops in each of said cords preparatory to forming them into knots, a plurality of mechanically operative lower needles, means for transferring said loops onto said lower needles, means for advancing the latter to seize the respective cords after the shoe-upper has been placed in position on these needles, means for severing the cords from the source of supply, means for retracting the lower needles whereby the severed portions of the cords are drawn through the upper and through said loops and the latter freed from the needles, thereby tying together the two ends of each length of cord, and means for releasing the several cords from the needles.

2. In a machine of the character described, the combination with a series of pairs of mechanically movable upper and lower needles having each pair thereof adapted to seize and hold a length of lacing-cord, and means for severing each cord from its source of supply, of means for producing a pair of loops in each cord and simultaneously transferring them onto the shoe-upper supporting lower needles before the severance of the cords, means for simultaneously retracting the lower needles thereby at the same time drawing the corresponding ends of the cords through the shoe-upper and said loops the latter meanwhile falling from the needles thus tying together the two ends of each cord, and means for releasing the several cords from the needles.

3. In a machine of the character described, the combination with a plurality of independently movable upper and lower cord-holding needles arranged in pairs, and means for drawing off and severing a corresponding number of lengths of lacing-cord from the sources of supply, of means for converting each of said lengths of cord into a pair of closed loops and transferring them onto the said lower needles, means for withdrawing the latter together with the ends of the cord held by them through said loops, and means for simultaneously releasing the ends of the several cords from the corresponding pairs of needles.

4. In a machine of the character described, a vertically movable cord and knife carrier and a horizontally movable upper needle for seizing the free end of the cord and drawing it rearwardly, in combination with means for converting said cord portion into a double loop, a horizontally movable lower needle, arranged with respect to said upper needle, adapted to pass endwise through said loop and seize the then severed end of the cord and draw it through the corresponding pair of eyelets of a shoe-upper and through the loop, thereby forming the knot, and means for releasing the ends of the cord from the needles.

5. In a machine of the character described, the combination with an endwise movable upper needle $c$, a pair of intermittingly vertically movable holders $h$ and an intermediate vertically movable member or finger $i$ adapted to receive a lacing-cord and convert it into a double loop, of an endwise movable lower needle $d$ adapted to pass through said loop and engage the cord, and means for stripping the loop from said holders onto said lower needle.

6. In a machine of the character described, the combination of a cord-carrier, an upper needle $c$ adapted to seize the free end of the cord and draw it rearwardly, a cord-severing device capable of independent movement mounted in said carrier, a lower needle or hook $d$ arranged to seize and hold the cord before the latter is severed, and means coacting with said lower needle for forming a knot in the ends of the severed cord.

7. In a machine of the character described, the combination of a reciprocating cord-carrier, a tension device for the cord mounted on and movable with said carrier, means coacting with said tension device for clamping the cord, means for severing the cord while it is held under such tension, means for inserting the thus severed portion of the cord through the eyelets of a shoe-upper, and means for tying together the two ends of the severed piece of cord.

8. In a machine of the character described, for simultaneously securing a plurality of independent lacing-cords in a corresponding number of pairs of registering eyelets in a shoe-upper, the combination of a plurality of pairs of intergearing vertically movable holders $h$, each holder having a shoulder formed at its lower end for supporting the corresponding lacing-cord, means for simultaneously rotating the several pairs of holders to produce a corresponding number of twisted loops, $s^1$, a non-revoluble vertically movable finger $i$ for each pair of said holders arranged to engage the cord portion connecting said loops, mechanism for simultaneously severing the lengths of thus looped cords from the supply, means for simultaneously inserting the severed cords through a similar number of pairs of eyelets in a shoe-upper and through the corresponding pairs of loops after the latter have been released from said holders, and means for simultaneously finishing the tying together of the two ends of each of said pieces of cord, thereby temporarily lacing the two quarters of the upper together.

9. In a machine of the character described, the combination of a pair of revoluble holders, each having a shoulder $h^9$ formed on its lower end arranged at right angles to the axis of the holder, said shouldered portion being recessed or cut away on its under side, movable strippers mounted on said holders, means for feeding a length of lacing-cord from the source of supply and simultaneously looping the same on and around said shoulders, an endwise movable needle and sleeve extending longitudinally through the recessed part of said loop-carrying shoulders, means for intermittingly operating said strippers to force the looped cord therefrom on to said sleeve, means for advancing the needle through its sleeve to seize another portion of the cord, and means for retracting both the needle and sleeve through said loops, thereby drawing the cord through the looped part to form a knot.

10. In a machine of the character described, the combination of a pair of revoluble holders, each having a loop-supporting shouldered portion $h^9$ provided with an open groove or recess on its under side, strippers movably mounted on the holders, an endwise movable needle extending through said grooves, and means coacting with the strippers for forcing the looped cord from the said shoulders onto the needle.

11. In a machine of the character described, the combination of a pair of needles arranged one above the other in horizontal planes, each consisting of a central or hook member adapted to hold a lacing-cord and an outer surrounding member or sleeve, means for imparting endwise movement to said needle members, means for forming a pair of connected loops in a length of the lacing-cord and transferring them onto the lower one of said needles, and a vertically movable finger $i$ having its lower end in engagement with the intermediate portion of the cord uniting said loops while the last-named needle is being retracted to free the loops therefrom.

12. In a machine of the character described, the combination of a pair of endwise movable cord-holding needles, each being provided with an outer sleeve, means for simultaneously forming a pair of connected loops in a length of the lacing-cord and transferring them onto the sleeve of one of said needles, and means for inserting a portion of the cord through the eyelets of a shoe-upper and also through said loops concurrently with the act of retracting the needle and its sleeve.

13. In a machine of the character described, the combination with a pair of horizontally mounted longitudinally movable needles, $c$, $d$, arranged one above the other, a vertically reciprocating carrier B and a pair of intergearing holder members $h$ revolubly mounted therein, of a vertically guided looper-finger $i$ mounted in said carrier, means connected with said member $i$ for vertically actuating the latter independently of the carrier, and means operatively connected with said holders whereby they may be simultaneously rotated in opposite directions, substantially as described and for the purpose set forth.

14. A machine for automatically and simultaneously securing together the two quarters of shoe-uppers by means of a series or plurality of independent lacing-cords passing through a corresponding series or number of pairs of eyelets in the upper, the same consisting essentially of mechanisms for simultaneously forming in each cord a pair of loops $s^1$ and severing the proper length of cords from the spools or supply, means for simultaneously drawing the cords through the corresponding pairs of eyelets and through said loops while the shoe-upper is held in position therefor, and means for simultaneously completing the tying together of the two ends of each lacing-cord extending from the upper.

15. In a machine for automatically securing together the eyeleted quarters of a shoe-upper, the combination of a plurality of movable initial cord-carrying and holding members, a plurality of loop and work-supporting needles arranged and adapted to coöperate with said cord-holding members, means for forming from the cord a pair of connected loops $s^1$ for each needle and placing them thereon, mechanisms coacting with each needle for holding another portion of the cord after it has been severed from the supply and drawing it through the eyelets of the upper previously placed on the needles and through said loops to form a knot, and means for releasing the thus acted upon shoe-upper from the machine.

16. In a machine of the character described the combination of an intermittently movable member $c$ for holding the free end of a lacing cord, an intermittently reciprocating needle $d$, means for forming a pair of loops $s^1$ in a cord between the member $c$ and the supply, and transferring them onto the needle, means for actuating the needle to draw a portion of the cord on the supply side of said loops through alined eyelet holes of shoe upper and through said loops to form a knot, and means for severing the cord.

17. A shoe upper lacing machine, having, in combination, means for severing a length of lacing cord from a supply, two needles coöperating to pass said length of lacing cord through alined eyelet holes in the opposite sides of a shoe upper and over the edges of the upper, and means for securing the ends of the cord together.

18. A shoe upper lacing machine, having, in combination, a plurality of sets of devices acting to pass a plurality of lacing cords through the eyelet holes of an upper and to secure the ends of the cords to form a lacing, and mechanism common to all of said sets of devices for actuating said devices.

19. A shoe upper lacing machine, having, in combination, means for drawing a length of lacing cord from a supply, means for severing the cord, a needle, means for actuating the needle to draw one end of the severed cord through alined eyelet holes in the opposite sides of a shoe upper, and means for tying the ends of the cord together.

20. A shoe upper lacing machine, having, in combination, a plurality of needles arranged to pass a plurality of lacing cords through a plurality of pairs of alined eyelet holes in the opposite sides of a shoe upper, means for holding said needles in position to permit the upper to be placed thereon, means for presenting a separate lacing cord to each needle, means for actuating the needles to draw one end of the lacing cords through the eyelets, and means for tying the ends of each lacing cord.

21. A shoe upper lacing machine, having, in combination, means for drawing lengths of lacing cord from a plurality of supplies, means for severing the lacing cords, means for inserting the cords through the eyelet holes of an upper after they have been severed from the supplies, and means for securing the ends of the cords to form a lacing.

22. A shoe upper lacing machine, having, in combination, a plurality of needles arranged to pass a plurality of lacing cords through a plurality of pairs of alined eyelets in the opposite sides of a shoe upper, means for actuating said needles, and means for securing the ends of said cords to form a lacing.

23. A shoe upper lacing machine, having, in combination, a plurality of needles arranged to pass a plurality of lacing cords through a plurality of pairs of alined eyelet holes in a shoe upper, means for holding said needles in position to permit the upper to be placed thereon, means for actuating the needles, and means for securing the ends of the lacing cords to form a lacing.

24. A shoe upper lacing machine, having, in combination, a plurality of pairs of needles, means for presenting a separate lacing cord to each pair of needles, means for actuating the needles to pass the lacing cords through the eyelet holes of an upper, and means for securing the ends of each cord to form a lacing.

25. A shoe upper lacing machine, having, in combination, means for severing a length of lacing cord from a supply, means for passing one end of the severed cord through alined eyelet holes in the opposite sides of a shoe upper and means for securing the ends of the cord together to form a lacing.

Signed at Portsmouth, N. H., this 12th day of March, 1904.

WILLARD A. SMITH.

Witnesses:
JOHN PENDER,
MARGARET FURBER.

Copies of this patent may be obtained for five cents each, by addressing the "Commissioner of Patents, Washington, D. C."